US008560619B1

(12) United States Patent
Huston et al.

(10) Patent No.: US 8,560,619 B1
(45) Date of Patent: Oct. 15, 2013

(54) EMAIL BANKRUPTCY

(75) Inventors: Catherine Emma Huston, Kitchener (CA); Ryan James Fioravanti, Kitchener (CA)

(73) Assignee: Google Inc., Mountain View, CA (US)

( * ) Notice: Subject to any disclaimer, the term of this patent is extended or adjusted under 35 U.S.C. 154(b) by 63 days.

(21) Appl. No.: 13/229,636

(22) Filed: Sep. 9, 2011

(51) Int. Cl.
*G06F 15/16* (2006.01)

(52) U.S. Cl.
USPC .......................................... 709/206; 709/224

(58) Field of Classification Search
USPC ........................ 709/206, 200–203, 217–227
See application file for complete search history.

(56) References Cited

U.S. PATENT DOCUMENTS

| 7,600,121 | B2* | 10/2009 | Davin ............................ | 713/170 |
|---|---|---|---|---|
| 2005/0114664 | A1* | 5/2005 | Davin ............................ | 713/170 |
| 2007/0172066 | A1* | 7/2007 | Davin ............................ | 380/262 |
| 2010/0205259 | A1* | 8/2010 | Vitaldevara et al. ........... | 709/206 |
| 2010/0228829 | A1* | 9/2010 | Niv ................................ | 709/206 |
| 2011/0191832 | A1* | 8/2011 | Davis et al. ...................... | 726/5 |
| 2011/0191847 | A1* | 8/2011 | Davis et al. ..................... | 726/22 |

OTHER PUBLICATIONS

"Email Bankruptcy"—Definition from Double-Tongued Dictionary, retrieved from <http://www.doubletongued.org/index.php/dictionary/email_bankruptcy>, posted Apr. 30, 2007.
Email Bankruptcy, Wikipedia, the Free Encyclopedia, retrieved from <http://en.wikipedia.org/wiki/Email_bankruptcy>, last modified on Oct. 31, 2010.
Rosenblum, Essay; In Lost E-mail, a Dividend, The New York Times, retrieved from <http://www.nytimes.com/2002/02/14/technology/essay-in-lost-e-mail-a-dividend.html?pagewanted=all&src=pm>, Feb. 14, 2002.
Musgrove, "E-Mail Reply to All: 'Leave Me Alone'", The Washington Post, retrieved from <http://www.washingtonpost.com/wp-dyn/content/article/2007/05/24/AR2007052402258.html>, May 25, 2007.
Email Bankruptcy—SearchExchange.com, retrieved from <http://searchexchange.techtarget.com/definition/email-bankruptcy>, Mar. 17, 2008.

* cited by examiner

*Primary Examiner* — Moustafa M Meky
(74) *Attorney, Agent, or Firm* — McDermott Will & Emery LLP (57) ABSTRACT

Methods, systems, and apparatus for reducing the delivery of undesirable electronic mail. In one aspect, a method includes, in response to receiving a request to declare email bankruptcy of an email account, emails identified as having undesirable content are identified based on one or more predetermined parameters and automatically moved to a designated location, and, for one or more senders of the emails, a notification is transmitted.

25 Claims, 5 Drawing Sheets

EMAIL BANKRUPTCY

BACKGROUND

Email bankruptcy describes a decision by a user to delete email messages older than a certain date, due to the receipt of an overwhelming number of messages. A message can be sent to senders explaining that their message may not have been read and to consider resending their message. Email bankruptcy, however, may not provide for distinguishing between wanted emails and undesirable emails (for example, spam or emails identified as having offensive content). Consequently, due to the ongoing receipt of spam and other undesirable automated email messages even after claiming email bankruptcy, a user may still need to change his or her email address completely and then manually inform contacts of the new email address.

SUMMARY

The subject technology relates generally to electronic mail services, particularly to reducing the delivery of undesirable electronic mail. According to one aspect, a computer implemented method includes in response to receiving a request to declare email bankruptcy of an email account, identifying emails having undesirable content based on one or more predetermined parameters, automatically moving the emails identified as having undesirable content to a designated location, and, transmitting a notification to one or more senders of emails identified as having undesirable content. Other aspects include corresponding systems, apparatus, and computer program products.

These and other aspects may include one or more of the following features. The method may include during a predetermined period of time, upon receiving an incoming email associated with one of the emails identified as having undesirable content, deleting the incoming email and transmitting a message instructing the sender to wait until after the predetermined period of time to resend the incoming email.

The designated location may be an archive location. In other aspects, the designated location may be a trash folder and the emails identified as having undesirable content are marked for deletion. Moving the emails to a designated location may include attaching or removing a label to the emails identified as having undesirable content.

The emails identified as having undesirable content may be initially set to at least all unread emails in the email account. In this regard, the method may include receiving one or more keywords, and determining one or more emails to exclude from the emails identified as having undesirable content by a search of the email account based on the one or more keywords.

The method may also include providing a selectable list of emails, and excluding from the emails identified as having undesirable content, one or more emails associated with one or more emails selected from the selectable list. In one aspect, the method may include providing a list of senders associated with the emails identified as having undesirable content, and excluding from the emails identified as having undesirable content one or more emails received from one or more selected senders.

In some aspects, the method may include providing an input for receiving one or more keywords, and determining at least a portion of the emails identified as having undesirable content by a search of the email account using one or more keywords received at the input. In other aspects, the method may include providing one or more inputs for receiving one or more senders, and determining at least a portion of the emails identified as having undesirable content by a search of the email account using one or more senders received at the one or more inputs.

The method may further include determining at least a portion of the emails identified as having undesirable content by comparing one or more groups of associated emails with a text classifier to determine one or more groups of automated emails. According to this aspect, the method may include upon receiving a command representative of a selected one of the automated emails, transmitting to a sender of the selected one of the automated emails an instruction to unsubscribe the email account from the selected one of the automated emails.

The method may also include transmitting the notification may include compiling a group of emails identified as having undesirable content associated with a single sender, and transmitting the notification to the single sender, wherein the notification includes a notification that the group of emails identified as having undesirable content will not be read.

According to another aspect, a machine-readable medium includes machine-executable instructions for performing a method, including receiving an instruction to declare email bankruptcy of the email account, receiving one or more parameters selected or input at a user interface, identifying designated emails based on at least the one or more parameters, removing the designated emails from the email account, and sending a notification to one or more senders associated with the designated emails. Other aspects include corresponding systems, apparatus, and computer program products.

These and other aspects may include one or more of the following features. The method may further include providing for display, a draft notification, and receiving the notification in response to the draft notification. The one or more parameters may include one or more received keywords, one or more selected senders, or one or more selected email addresses. Determining emails may include removing one or more selected emails from the designated emails. Identifying the designated emails may include removing emails from one or more selected senders from the designated emails.

According to another aspect, a computer implemented method may include, upon receiving a command representative of a request to declare email bankruptcy of an email account, identifying a first set of senders based on one or more predetermined parameters, deleting or moving to a designated location emails from the first set of senders, while retaining within the email account emails from a second set of senders, and transmitting to one or more of the first set of senders a notification related to the deleting or moving of one or more associated emails. Other aspects include corresponding systems, apparatus, and computer program products.

These and other aspects may include one or more of the following features. The method may further include, upon receiving an incoming email associated with the first set of senders during a predetermined period of time, deleting the incoming email and transmitting a message instructing the sender to wait until after the predetermined period of time to resend the incoming email. The notification may inform the sender that the one or more associated emails will not be read. Deleting or moving to a designated location may include attaching a label to, or removing a label from, the one or more associated emails.

It is understood that other configurations of the subject technology will become readily apparent from the following detailed description, wherein various configurations of the subject technology are shown and described by way of illustration. As will be realized, the subject technology is capable of other and different configurations (for example, a machine-readable medium including machine-executable instructions for performing the above method), and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
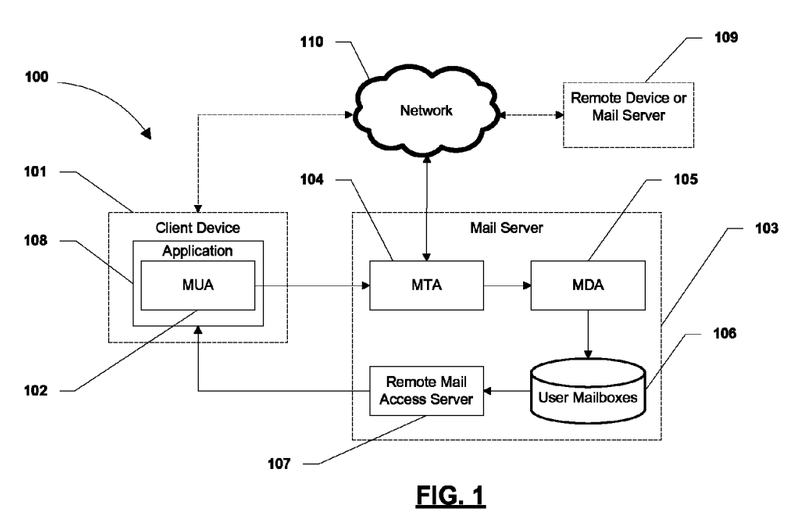
FIG. 1 is a diagram of an example system for declaring email bankruptcy of an email account, including a client device and mail server for managing an email account.

FIG. 1 is a diagram of an example system for declaring email bankruptcy of an email account, including a client device and mail server for managing an email account. In one aspect, a system 100 includes an email service (for example, a web-based email service or email client), including one or more client devices 101 (for example, a personal computer, laptop or tablet computer, server, a smart phone, personal digital assistant (PDA), or the like) and one or more mail servers 102, configured for sending and receiving email and for providing one or more email accounts to one or more users. A client device 101 may include a mail user agent (MUA) 102, and a mail server 103 may include a mail transport agent (MTA) 104, a mail delivery agent (MDA) 105, one or more user mailboxes 106, a remote mail access server 107, or other components for facilitating the sending or receiving of email.

MUA 102 handles tasks related to the creation and addressing of outgoing mail messages, and retrieves incoming mail messages from a mail server. MUA 102 may be included as part of an email client application 108 located on client device 101. In one aspect, email client application 108 may include a webmail client: an email client implemented as a web application and accessed through a web browser. In this regard, email client application 108 may be accessed by one or more remote client machines 109 operably connected to client device 101 over a network 110 (for example, the Internet, an internet, or other network). In another aspect, email client application 108 may include a desktop email client application 108 located on a client device 101, and configured to connect to mail server 103 (for example, over a network).

MTA 104, MDA 105, user mailboxes 106 and remote mail access server 107 may be part of a mail server application on mail server 102. MTA 104 may manage the process of transferring mail between computers (for example, between mail server 103 and a remote mail server 109), and MDA 105 may be responsible for delivery of email to individual user mailboxes. The user mailboxes may be implemented as a local file system on a hard disk, a database, or other memory device configured for storing incoming and outgoing mail messages. The remote mail access server may provide user access through a client device 101 to mail stored in a user mailbox using a remote mail access protocol, for example, Internet Message Access Protocol (IMAP) or Post Office Protocol 3 (POP3).

Figure 2:
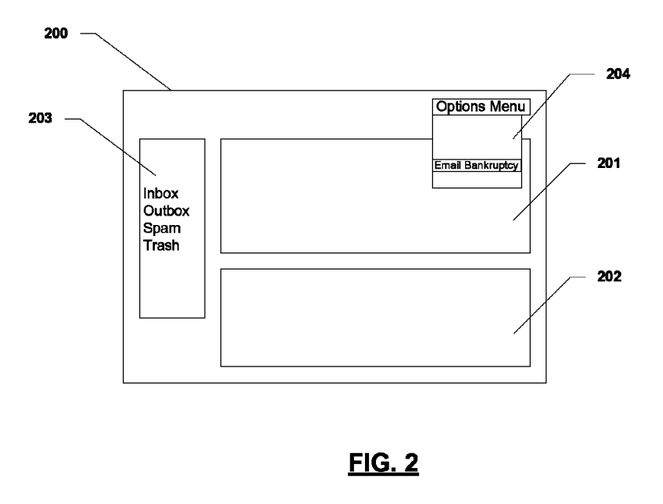
FIG. 2 is a diagram of an example user interface of an email client application.

FIG. 2 is a diagram of an example user interface of an email client application. Mail client application 103 may include a user interface 200 for user interaction with an email account. User interface 200 may include many functions for managing an email account, including a message pane 201, an (optional) reading pane 202, or one or more email-related folders 203 such as, for example, an inbox, outbox, spam, or trash folder. User interface 200 may be configured to be displayed in one of several formats, including, for example, in a web browser or window on client device 101.

In one aspect, user interface 200 may include a selection for receiving an instruction to declare email bankruptcy. In this regard, email bankruptcy may be declared by selecting an option from a menu 204 associated with the email account, or, in some aspects, by activating a graphical representation of a button located on user interface 200 (for example, a "panic" button). System 100 may be configured to, when the selection is made to declare email bankruptcy, execute a series of steps to intelligently remove emails identified as having undesirable content (for example, remove emails indicated as having offensive or otherwise undesirable content based on parameters predetermined by a user). System 100 may be configured to then prevent the receipt of further undesirable emails, while retaining other emails, thereby returning the email account to a default state (for example, a state in which a number of emails retained in the account or received in the future is determined by a set of predetermined parameters). To that end, system 100 may be configured to automatically move emails from the email account to an archive location and notify the senders of those emails that the emails may not have been read. For example, designated emails may be removed from a user's inbox and optionally placed in a folder separated from the email account. In some aspects, the emails to be moved, archived, or deleted may be determined based on content settings established by one or more parameters entered at user interface 200.

Figure 3:
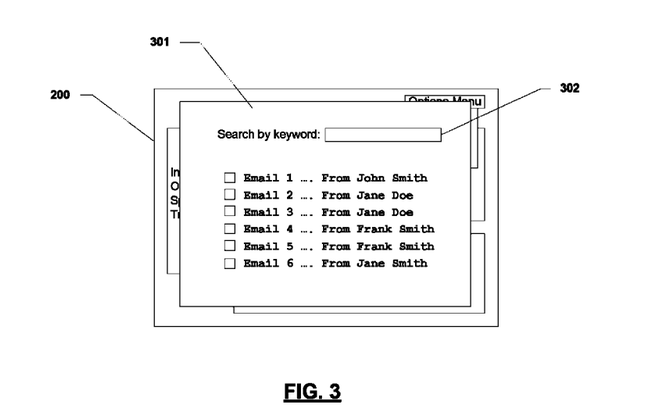
FIG. 3 is a diagram of an example user interface of an email client application, including a parameter review screen.

FIG. 3 is a diagram of an example user interface of an email client application, including a parameter review screen. User interface 200 may provide, as part of the steps executed on activation, a parameter review screen 301 (for example, a window dialog or webpage) operable for selecting or inputting one or more parameters to determine, at least in part, which emails include undesirable content or should or should not be moved (for example, removed from the email account or archived) to the archive location. Parameter review screen 301 may, for example, include text inputs (for example, a keyword search) or graphical controls (for example, buttons, checkboxes, radio buttons, or sliders) that may be used to determine parameters for distinguishing wanted and undesirable email messages, mailing lists, or other types of emails or senders of the same.

To restore the email account to the default state, system 100 may be configured to initially determine or identify all emails, or all unread emails, as having undesirable content, and designate them for removal from the email account. These emails may then be displayed, reviewed, or filtered by a user parameter review screen 301 (or other screen of user interface 200) to narrow or expand the emails before they are moved to the archive location. For example, parameter review screen 301 may initially display a list of emails, groups of related emails, or sender email address that are designated to be moved to an archive location. The user may then enter keywords or select other parameters to remove some emails from the listed emails.

In one aspect, parameter review screen 301 (or user interface 200) may provide an input 302 (for example, a text input) for receiving one or more parameters as keywords. On receiving one or more keywords, system 100 may perform a search of the email account, or within emails identified as having undesirable content, for emails containing the keywords or related to the keywords. For example, when presented with parameter review screen 301, a user may enter the word "immigration" to generate a list of emails that include the word "immigration" in the subject or body of the email. System 100 may perform a search of the emails stored in the email account having the term "immigration", or, in some aspects, perform a semantic search for emails including a term related to immigration (for example, having a similar meaning). The user may then select which of the listed emails including terms relating to "immigration" to remove from the group of emails designated to be moved as part of the email bankruptcy process.

In other aspects, parameter review screen 301 may display one or more groups of emails received as part of one or more subscribed mailing lists or other automated email. In this regard, undesirable content may be determined by a text classifying system (for example, similar to that used to detect spam). System 100 may be configured to use a text classifier to classify emails, or groups of emails, and then compare them to each other to determine emails sent as a result of being subscribed to one or more mailing lists or belonging to one or more groups of automated emails. In some aspects, mailing lists or automated email may also be detected by determining a volume of similar emails received from the same sending location. Once determined, the emails may be grouped, for example, by sender, and presented to a user for inclusion or exclusion from the email bankruptcy process.

After a group of automated email or mailing lists have been determined by system 100 or selected by a user, system 100 may be configured to attempt to remove the email account of the user declaring email bankruptcy from selected mailing lists or groups. In one aspect, the system may try unsubscribe methods for unsubscribing a user (for example, transmitting a message to the sender with "unsubscribe" in the subject box, replying to an embedded "unsubscribe" hyperlink, or the like). In other aspects, the system may use a predetermined unsubscribe feature. The unsubscribe process may be automatically or manually initiated. In yet other aspects, the system may temporarily or permanently block future emails originating from the selected mailing lists or groups.

In another aspect, undesirable content may be based on where an email originated, including, for example, sender or sender location. In this regard, some senders may be identified when setting parameters such that their emails will not be moved to the archive location or deleted during the email bankruptcy process. System 100 may be configured to provide, through user interface 103 or parameter review screen 301, a list of the senders responsible for sending emails designated to be removed. The list of senders may include the senders of emails currently in the email account (for example, addresses from which the email account received one or more emails), senders of emails found using keywords or other search criteria (for example, entered using input 302), senders of automated emails, or the like. A user may then use parameter review screen 301 to select which senders (for example, using checkboxes) whose emails should be included or excluded in the email bankruptcy process. For example, a user may choose to select certain family members (for example, "mom") so that emails originating from the selected family members will not be moved or deleted.

Various means or methods described herein for selecting undesirable content may be used to determine a group of emails to be excluded from a group of already designated emails, or to determine a group of emails to be moved during the email bankruptcy process; and, there may be other various means or methods may also be used without deviating from the scope of the subject technology. For example, system 100 may be configured to not initially designate emails to be moved as part of the email bankruptcy process. The previously described methods (for example, using keywords, selecting email groups or senders, or the like) may then be used to generate a list of emails to be moved when declaring email bankruptcy.

In a further aspect, parameter review screen 301 may also include information pertaining to an amount of data (for example, in megabytes (MB)) currently in the email account, or designated to be removed. Using one or more controls, a user may adjust the future size of the stored data by selecting emails to include or remove from the email bankruptcy process. In some aspects, the emails to include or remove may be selected based on size. In this manner, the system provides its user with knowledge about the amount of data and a means to rapidly reduce the size of that data based on the previously described selected or inputted parameters.

Figure 4:
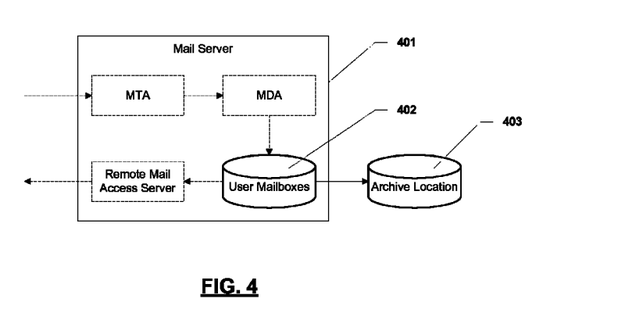
FIG. 4 is a diagram of an example system for declaring email bankruptcy of an email account, including an archive location for relocating emails identified as having undesirable content.

FIG. 4 is a diagram of an example system for declaring email bankruptcy of an email account, including an archive location for relocating emails identified as having undesirable content. In one aspect, a mail server 401 may be configured to move user emails from a user mailbox 402 to one or more archive locations 403. User mailbox 402 or an archive location 403 may be implemented as a local file system (for example, a collection of file folders) on a hard disk, a database, or other memory device configured for storing incoming and outgoing mail messages. In one aspect, the archive location may be predetermined or automatically generated by the system, or selected by the user at the time of declaring email bankruptcy. The emails designated to be moved may include all emails in the email account, emails in a particular file location of the email account (for example, chosen by the user), unread emails, tagged or labeled emails, other emails determined based on content settings established by specified parameters, or the like.

In one example, the email account may include a system for assigning tags or labels to emails for efficient organization and management of the email account, including assigning emails to categories for mass archiving, deletion, or searching. When an email is designated to be archived, moved, or as having undesirable content, a label or tag may be associated with the email so, if the email is later viewed (for example, through a search of the archive location), it is clear that the message was labeled because of a bankruptcy action. In one aspect, system 100 may be configured to associate the label or tag to designated emails and then move the emails to one or more archive locations based on the associated label.

In connection with moving designated emails, system 100 may transmit a notification to the senders of the emails informing the senders that their email(s) may not have been read and to wait until after a predetermined period of time to resend the email(s). The predetermined time may be determined by one or more parameters set at the time email bankruptcy is declared. However, the predetermined time may also be set to a default setting (for example, one week), or set by a menu option located at user interface 103. Alternatively, system 100 may be configured to inform the senders that the email account is temporarily closed or that their email has been deleted, or to instruct one or more senders that the email account has been temporarily or permanently disabled and provide information to the sender on how to contact the user another way.

After the designated emails have been moved and the email account returned to the default state, system 100 may be configured to, for a predetermined period of time, limit or prevent further incoming emails associated with the emails already removed. Along these lines, system 100 may be configured to monitor incoming emails for messages that have substantially similar content to, or are duplicates of, one or more removed emails. For example, a text comparison may determine that the messages are similar beyond a threshold value. An email having substantially similar content to an email that was moved to an archive location as part of the email bankruptcy process may also be immediately moved to the archive location, labeled as undesirable, or deleted. In other aspects, system 100 may be configured to compare content of incoming emails received by mail server 102 to the already designated undesirable content (for example, based on keywords, senders, automated emails, and the like, input or selected at parameter review screen 301) to determine whether the email should be received into the email account.

In one aspect, notifications sent by system 100 (for example, when emails are moved or later received and deleted) may be grouped (or batched together) by sender before being transmitted. For example, where multiple emails from a single email address have been moved or deleted by the email bankruptcy process, a list of those emails may be compiled and provided in a single notification addressed to the common email address. Each email listed in the notification may include at least a portion of the email for identification purposes, for example, time, date, at least a portion of the subject line or body, or the like. In this manner, each email address may be sent one email, significantly saving resources and providing the user receiving the notification an easy way to determine which emails were not read or deleted. In one example, if emails having the word "immigration" were excluded from the email bankruptcy process, a notification may include a list of emails from a certain sender except for those emails from that sender that included the word "immigration".

In another aspect, the parameters for email bankruptcy may be set prior to declaring email bankruptcy. For example, a user may elect to navigate to parameter review screen 301 to set or store one or more parameters prior to declaring email bankruptcy. Once the parameters have been saved, the previously described functions may be activated by the previously described menu option or "panic button." Once activated, the system and method archives the designated emails and notifies senders in accordance with the stored parameters, reducing the amount of manual sifting through emails by a user to determine which to save.

Figure 5:
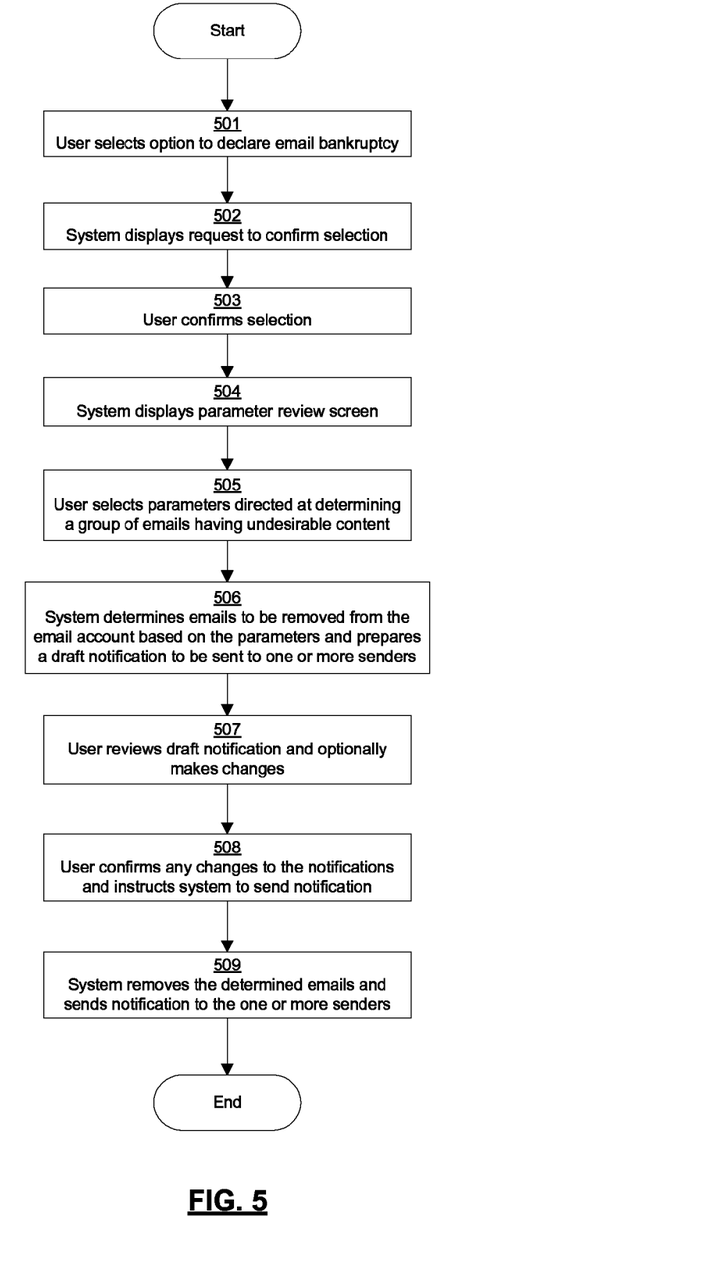
FIG. 5 shows a flowchart illustrating an example process for declaring email bankruptcy of an email account.

FIG. 5 shows a flowchart illustrating an example process for declaring email bankruptcy of an email account. As described previously, the option may be selected from a menu at a user interface associated with an email account, from a graphical representation, or the like. In step 502, the system displays an alert, including a request to confirm the selection to declare email bankruptcy, which may then be confirmed by the user at step 503. Confirmation may be indicated, for example, by clicking on an acceptance button on a dialog of a display screen. In step 504, a parameter review screen is displayed for reviewing default parameters, or for updating, selecting or inputting one or more parameters to determine if there is anything a user may wish to exclude from the email bankruptcy process. The parameter review screen may be in the form of a user interface having text inputs (for example, a keyword search) or graphical controls (for example, buttons, checkboxes, or sliders) to input or select parameters to facilitate a determination of emails that have undesirable content. In one aspect, parameters that may be input at the parameter review screen may include one or more keywords. In another aspect, the parameters may include one or more selected senders or sender email addresses. In yet another aspect, the parameters may include one or more selected emails. In some aspects, the determination of emails identified as having undesirable content may be facilitated by using the parameter review screen to search for and remove one or more selected emails, or emails from one or more designated senders. This may be accomplished, for example, by the input or selection of parameters to perform a search of emails or groups of emails and then selecting them for removal from the designated emails.

In step 505, the user selects or inputs one or more parameters directed at determining a group of emails identified as having undesirable content. Based on the selected or inputted parameters, in step 506, the system determines which emails will be removed from the email account or moved to an archive location. In one aspect, emails identified as having undesirable content may be grouped by their sender's email address so that the sender may be notified that the grouped emails will not be read by the user. In connection with determining which emails should be removed, the system prepares a draft notification to be sent to one or more senders associated with the group of emails identified as having undesirable content. The draft notification may, for example, contain language informing its recipient that one or more emails associated with the draft notification has not been read. Then, in step 507, the user may review the draft notification, and optionally make changes. In some aspects, the system may display as part of step 506 or 507, an alert to the user that the process may not be reversed. In step 508, the user confirms the changes and instructs the system to proceed with email bankruptcy. Once the instruction to proceed has been given, in step 509, the system removes the determined emails and sends the notification to the one or more designated senders.

Figure 6:
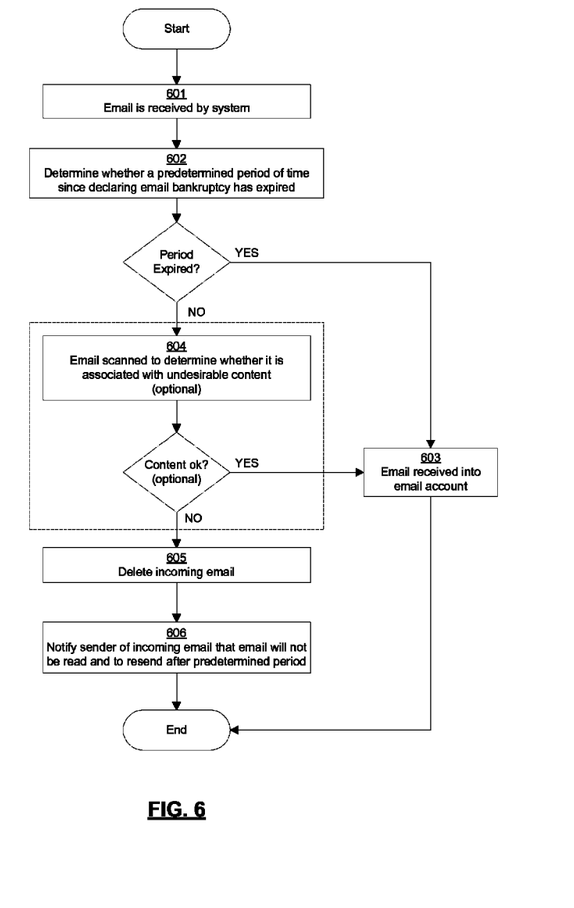
FIG. 6 shows a flowchart illustrating an example process for preventing the receipt of new emails after email bankruptcy has been declared.

FIG. 6 shows a flowchart illustrating an example process for preventing the receipt of new emails after email bankruptcy has been declared. For a predetermined period of time (for example, one week) after activating email bankruptcy, the system may monitor incoming emails for undesirable content. In step 601, an incoming email is received by the system. In step 602, the system may perform a check to determine whether a predetermined period since declaring email bankruptcy has expired. If it has, the incoming email may be received into the account at step 603. If the period has not expired then the system may proceed to optional step 604. In step 604, the incoming email is scanned to determine whether it is associated with the emails identified as having undesirable content. In this manner, the incoming email may be determined to include content in its subject or body that relates to an undesirable keyword or sender address selected or input at the parameter review screen, or that is substantially similar to an email previously moved as part of the email bankruptcy process. In some aspects, an incoming email may be flagged as having undesirable content if the system is configured to reject all emails for the predetermined period of time. To this end, if the incoming email is not flagged then the process returns to step 603 and the email is received into the account. Otherwise, if the content is flagged as being undesirable then the system proceeds to step 605. In step 605, the incoming email is immediately deleted and then, in step 606, a notification is sent to the sender of the incoming email instructing the sender that the email will not be read and to wait until after the predetermined period of time to resend the email.

Figure 7:
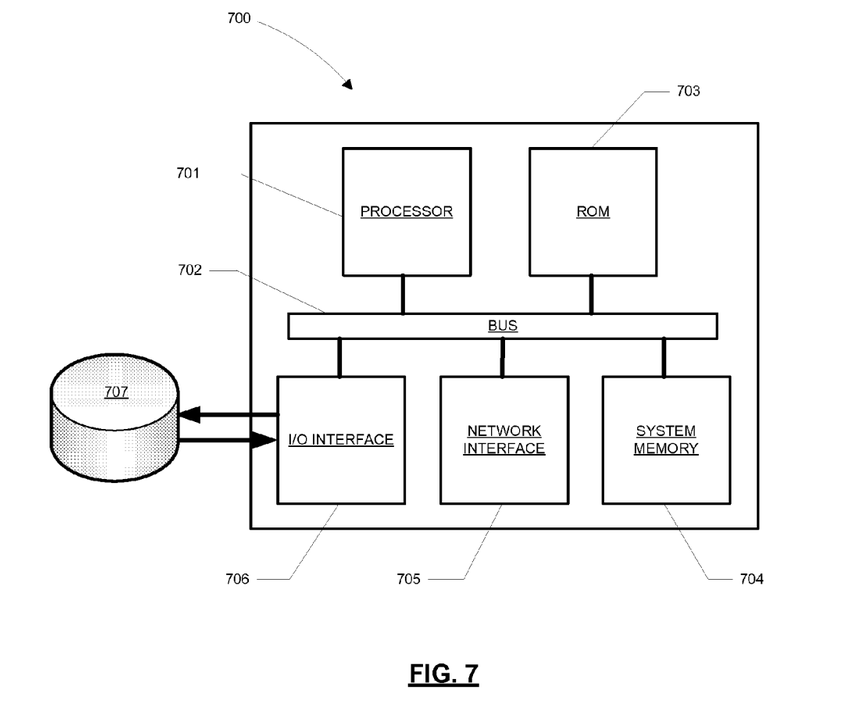
FIG. 7 is a diagram illustrating an example server system for declaring email bankruptcy of an email account, including a processor and other internal components.

FIG. 7 is a diagram illustrating an example server system for declaring email bankruptcy of an email account, including a processor and other internal components. In some aspects, a computerized device 700 (for example, client device 101, mail server 102, remote device or mail server 104, or the like) includes several internal components, for example, a processor 701, a system bus 702, read-only memory 703, system memory 704, network interface 705, input/output (I/O) interface 706, and the like. In one aspect, processor 701 may also be communication with a storage medium 707 (for example, a hard drive, database, or data cloud) using I/O interface 706. In some aspects, all of these elements of device 700 may be integrated into a single device. In other aspects, these elements may be configured as separate components.

Processor 701 may be configured to execute code or instructions to perform the operations and functionality described herein, manage request flow and address mappings, and to perform calculations and generate commands. Processor 701 is configured to monitor and control the operation of the components in server 700. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a read only memory (ROM) within processor 701. Likewise, one or more sequences of instructions may be software stored and read from system memory 705, ROM 703, or received from a storage medium 707 (for example, using I/O interface 706). ROM 703, system memory 705, and storage medium 707 represent examples of machine or computer readable media on which instructions/code may be executable by processor 701. Machine or computer readable media may generally refer to any medium or media used to provide instructions to processor 701, including both volatile media, for example, dynamic memory used for system memory 704 or for buffers within processor 701, and non-volatile media, for example, electronic media, optical media, and magnetic media.

In some aspects, processor 701 is configured to communicate with one or more external devices (for example, using I/O interface 706). Processor 701 is further configured to read data stored in system memory 704 or storage medium 707 and to transfer the read data to the one or more external devices in response to a request from the one or more external devices. The read data may include one or more web pages or other software presentation to be rendered on the one or more external devices. The one or more external devices may include a computing system, for example, a personal computer, a server, a workstation, a laptop computer, PDA, smart phone, and the like.

In some aspects, system memory 704 represents volatile memory used to temporarily store data and information used to manage device 700. According to one aspect of the subject technology, system memory 704 is random access memory (RAM), for example, double data rate (DDR) RAM. Other types of RAM also may be used to implement system memory 504. Memory 704 may be implemented using a single RAM module or multiple RAM modules. While system memory 704 is depicted as being part of device 700, those skilled in the art will recognize that system memory 704 may be separate from device 700 without departing from the scope of the subject technology. Alternatively, system memory 704 may be a non-volatile memory, for example, a magnetic disk, flash memory, peripheral solid state drive (SSD), and the like.

Input/output (I/O) interface 706 may be configured to be coupled to one or more external devices, to receive data from the one or more external devices and to send data to the one or more external devices. I/O interface 706 may include both electrical and physical connections for operably coupling I/O interface 706 to processor 701, for example, through bus 702. I/O interface 706 is configured to communicate data, addresses, and control signals between the internal components attached to bus 702 (for example, processor 701) and one or more external devices (for example, a hard drive). I/O interface 706 may be configured to implement a standard interface, for example, Serial-Attached SCSI (SAS), Fiber Channel interface, Peripheral Component Interconnect Express (PCIe), Serial Advanced Technology Attachment (SATA), universal serial bus (USB), and the like. I/O interface 706 may be configured to implement only one interface. Alternatively, I/O interface 706 may be configured to implement multiple interfaces, which are individually selectable using a configuration parameter selected by a user or programmed at the time of assembly. I/O interface 706 may include one or more buffers for buffering transmissions between one or more external devices and bus 702 or the internal devices operably attached thereto.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (for example, arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description provides various examples of the subject technology, and the subject technology is not limited to these examples. Various modifications to these aspects will be readily apparent, and the generic principles defined herein may be applied to other aspects.

The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims. Headings and subheadings, if any, are used for convenience only and do not limit the invention.

What is claimed is:

1. A computer implemented method comprising:
   receiving, from a user, a request to declare email bankruptcy of an email account associated with the user;
   in response to receiving the request, identifying emails having undesirable content based on one or more predetermined parameters;
   automatically moving the emails identified as having undesirable content to a designated location; and
   transmitting a notification to one or more senders of emails identified as having undesirable content.

2. The computer implemented method of claim 1, further comprising:
   during a predetermined period of time, upon receiving an incoming email associated with one of the emails identified as having undesirable content, deleting the incoming email and transmitting a message instructing the sender to wait until after the predetermined period of time to resend the incoming email.

3. The computer implemented method of claim 1, wherein the designated location is an archive location.

4. The computer implemented method of claim 1, wherein the designated location is a trash folder and the emails identified as having undesirable content are marked for deletion.

5. The computer implemented method of claim 1, wherein the emails identified as having undesirable content is initially set to at least all unread emails in the email account.

6. The computer implemented method of claim 5, further comprising:
   receiving one or more keywords; and
   determining one or more emails to exclude from the emails identified as having undesirable content by a search of the email account based on the one or more keywords.

7. The computer implemented method of claim 5, further comprising:
   providing a selectable list of emails; and
   excluding from the emails identified as having undesirable content, one or more emails associated with one or more emails selected from the selectable list.

8. The computer implemented method of claim 5, further comprising:
   providing a list of senders associated with the emails identified as having undesirable content; and
   excluding from the emails identified as having undesirable content one or more emails received from one or more selected senders.

9. The computer implemented method of claim 1, further comprising:
   providing an input for receiving one or more keywords; and
   determining at least a portion of the emails identified as having undesirable content by a search of the email account using one or more keywords received at the input.

10. The computer implemented method of claim 1, further comprising:
    providing one or more inputs for receiving one or more senders; and
    determining at least a portion of the emails identified as having undesirable content by a search of the email account using one or more senders received at the one or more inputs.

11. The computer implemented method of claim 1, further comprising:
    determining at least a portion of the emails identified as having undesirable content by comparing one or more groups of associated emails with a text classifier to determine one or more groups of automated emails.

12. The computer implemented method of claim 11, further comprising:
    upon receiving a command representative of a selected one of the automated emails, transmitting to a sender of the selected one of the automated emails an instruction to unsubscribe the email account from the selected one of the automated emails.

13. The computer implemented method of claim 1, wherein transmitting the notification includes:
    compiling a group of emails identified as having undesirable content associated with a single sender; and
    transmitting the notification to the single sender, wherein the notification includes a notification that the group of emails identified as having undesirable content will not be read.

14. The computer implemented method of claim 1, wherein moving to a designated location includes attaching or removing a label to the emails identified as having undesirable content.

15. A machine-readable medium including machine-executable instructions for performing a method comprising:
    receiving, from a user, an instruction to declare email bankruptcy of an email account associated with the user;
    providing, in response to the instruction, a user interface for selecting parameters related to reducing the amount of emails;
    receiving one or more parameters selected or input at the user interface;
    identifying designated emails based on at least the one or more parameters;
    removing the designated emails from the email account; and
    sending a notification to one or more senders associated with the designated emails.

16. The machine-readable medium of claim 15, the method further comprising:
    providing for display, a draft notification; and
    receiving the notification in response to the draft notification.

17. The machine-readable medium of claim 15, wherein the one or more parameters include one or more received keywords.

18. The machine-readable medium of claim 15, wherein the one or more parameters include one or more selected senders.

19. The machine-readable medium of claim 15, wherein the one or more parameters include one or more selected email addresses.

20. The machine-readable medium of claim 15, wherein determining emails includes removing one or more selected emails from the designated emails.

21. The machine-readable medium of claim 15, wherein identifying the designated emails includes removing emails from one or more selected senders from the designated emails.

22. A computer implemented method comprising:
    receiving an indication that a user has made a request to declare email bankruptcy of an email account associated with the user;
    upon receiving the command, identifying a first set of senders based on one or more predetermined parameters;
    deleting or moving to a designated location emails from the first set of senders, while retaining within the email account emails from a second set of senders; and transmitting to one or more of the first set of senders a notification related to the deleting or moving of one or more associated emails.

23. The computer implemented method of claim 22, further comprising:
upon receiving an incoming email associated with the first set of senders during a predetermined period of time, deleting the incoming email and transmitting a message instructing the sender to wait until after the predetermined period of time to resend the incoming email.

24. The computer implemented method of claim 23, wherein the notification informs the sender that the one or more associated emails will not be read.

25. The computer implemented method of claim 22, wherein deleting or moving to a designated location includes attaching a label to, or removing a label from, the one or more associated emails.

* * * * *